(12) United States Patent
Buttolph et al.

(10) Patent No.: US 10,308,347 B2
(45) Date of Patent: Jun. 4, 2019

(54) WING TIP AILERON ACTUATION SYSTEM

(71) Applicant: Simmonds Precision Products, Inc., Vergennes, VT (US)

(72) Inventors: Martin Edwy Buttolph, Leicester, VT (US); David F. Moran, Bloomfield, CT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 394 days.

(21) Appl. No.: 15/334,801

(22) Filed: Oct. 26, 2016

(65) Prior Publication Data

US 2018/0111675 A1 Apr. 26, 2018

(51) Int. Cl.
*B64C 3/56* (2006.01)
*B64C 9/00* (2006.01)

(52) U.S. Cl.
CPC .............. *B64C 3/56* (2013.01); *B64C 9/00* (2013.01); *B64C 2009/005* (2013.01)

(58) Field of Classification Search
CPC .................................. B64C 3/56; B64C 9/00
See application file for complete search history.

(56) References Cited

U.S. PATENT DOCUMENTS

| | | | |
|---|---|---|---|
| 2,538,602 A * | 1/1951 | Taylor | B64C 3/56 244/49 |
| 2,601,962 A | 7/1952 | Douglas | |
| 2,937,828 A | 5/1960 | Clark et al. | |
| 4,635,881 A * | 1/1987 | Brieseck | F42B 10/14 244/3.24 |
| 5,039,030 A * | 8/1991 | Kraus | F42B 10/14 244/3.28 |
| 5,141,175 A * | 8/1992 | Harris | F42B 10/14 102/384 |
| 5,192,037 A | 3/1993 | Moorefield | |
| 5,615,846 A * | 4/1997 | Shmoldas | F42B 15/105 244/3.26 |
| 5,671,899 A * | 9/1997 | Nicholas | B64C 3/40 244/3.28 |
| 6,186,443 B1 * | 2/2001 | Shaffer | B64C 5/12 244/3.29 |
| 6,454,205 B2 * | 9/2002 | Niemeyer | F42B 10/20 244/3.24 |
| 6,695,252 B1 | 2/2004 | Dryer | |
| 6,758,435 B2 * | 7/2004 | Niemeyer | F42B 10/14 244/3.24 |
| 6,880,780 B1 | 4/2005 | Perry et al. | |

(Continued)

*Primary Examiner* — Justin M Benedik
(74) *Attorney, Agent, or Firm* — Kinney & Lange, P.A.

(57) ABSTRACT

A control system for a flight vehicle includes first and second pivot pins each having a hollow cylindrical shape with an opening therein, first and second deployable wings configured to pivot about the first and second pivot pins between a stowed position and a deployed position with the first and second deployable wings each having first and second wing tip shafts extending between the first and second pivot pins and first and second ailerons at a tip of the deployable wings, first and second lever pins within the opening in the pivot pins with the first and second lever pins each having a first end that extends out from a top of the pivot pin and a second end connected to the wing tip shaft and with the first and second lever pins configured to rotate the wing tip shafts to control the ailerons.

20 Claims, 4 Drawing Sheets

(56) References Cited

U.S. PATENT DOCUMENTS

| | | | | |
|---|---|---|---|---|
| 7,147,181 | B2* | 12/2006 | Selin | F42B 10/14 244/3.27 |
| 7,185,847 | B1* | 3/2007 | Bouchard | F42B 10/12 244/3.28 |
| 8,415,598 | B1* | 4/2013 | Terhune | F42B 10/18 102/490 |
| 8,592,737 | B2* | 11/2013 | Deschatre | F42B 10/64 244/3.27 |
| 8,946,607 | B2* | 2/2015 | Gettinger | B64C 39/024 244/3.27 |
| 9,086,258 | B1* | 7/2015 | Vasudevan | F42B 15/01 |
| 9,429,402 | B2* | 8/2016 | Plumer | F16H 21/54 |
| 10,124,880 | B1* | 11/2018 | Ellzey | B64C 3/385 |
| 2007/0262194 | A1* | 11/2007 | Agrawal | B64C 33/02 244/11 |
| 2010/0264260 | A1* | 10/2010 | Hammerquist | B64C 3/56 244/49 |
| 2015/0353186 | A1* | 12/2015 | Buttolph | B64C 13/28 244/201 |

* cited by examiner

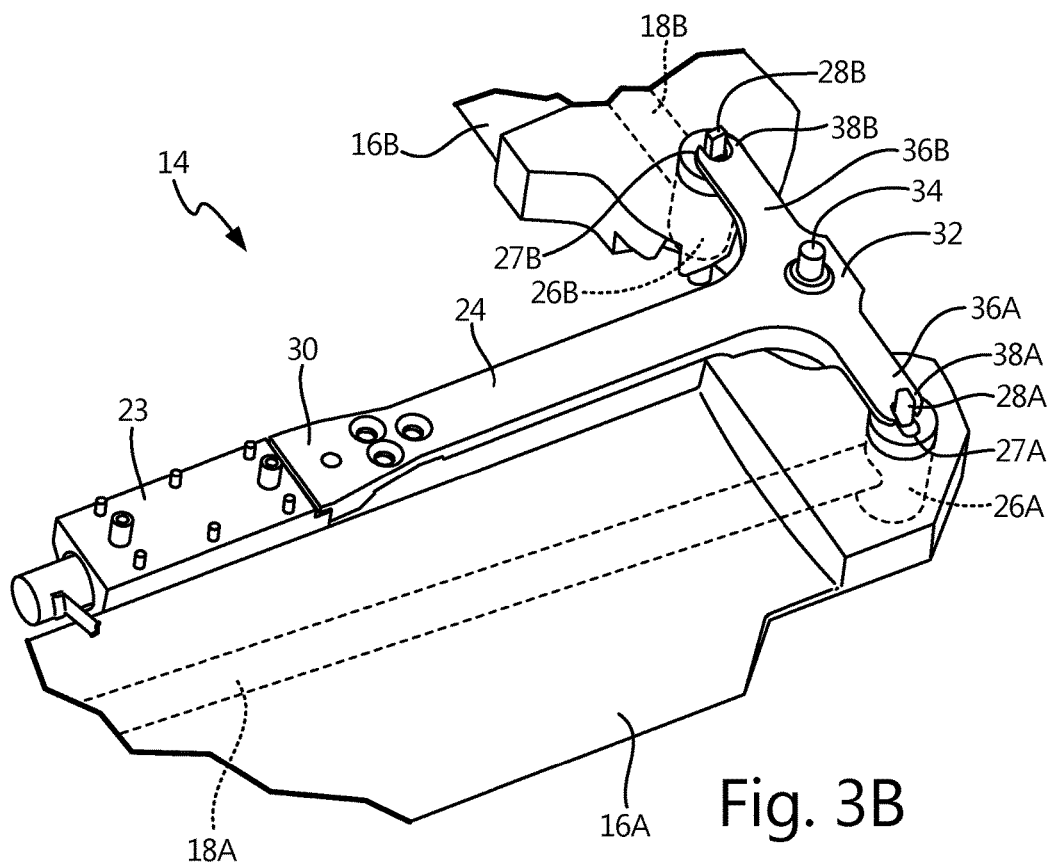
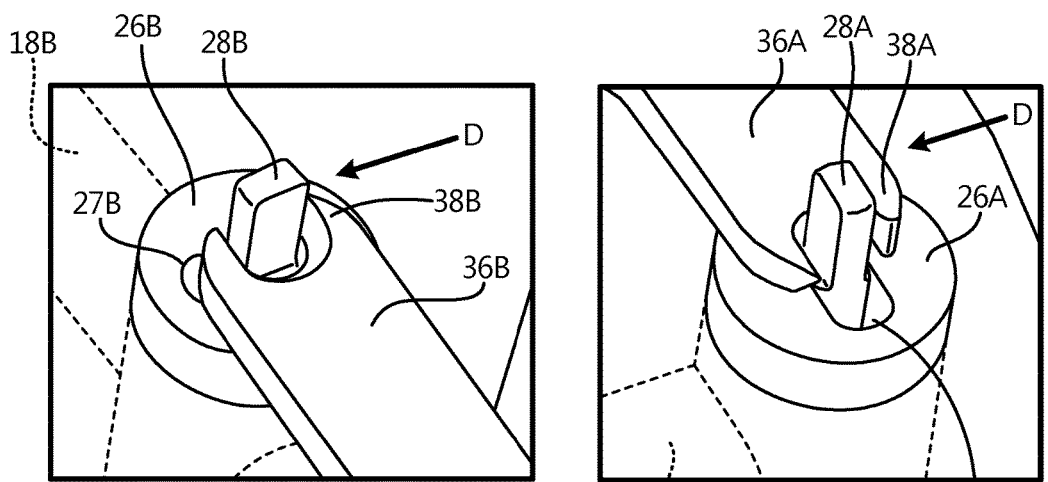

WING TIP AILERON ACTUATION SYSTEM

BACKGROUND

Small flight vehicles, such as glide bombs and precision guided munitions, benefit from the use of deployable wings to help control the flight vehicle after the flight vehicle has been launched. These wings include ailerons at the wing tips for control. However, because the wings are deployable and pivot about points within the flight vehicle housing, providing a system for actuation of the ailerons is difficult because the actuation must be transferred through the pivot points, out the wings, and to the ailerons at the wing tips. Additionally, the wing tip aileron actuation system needs to be light weight to increase the efficiency of the flight vehicle, inexpensive, and reliable to ensure control of the ailerons is accurate so that the flight vehicle is able to carry out the flight with a high degree of certainty.

SUMMARY

A flight vehicle equipped with a wing tip aileron actuation system includes an actuator, a bell crank, and first and second wings configured to be contained within a housing when in a stowed position and extend outward from the housing when in a deployed position. The bell crank has a first end connected to the actuator, a pivot point at a second end, and first and second arms extending outward from the second end with the first arm having a first fork and the second arm having a second fork (with each fork having two prongs that extends outward). The flight vehicle also includes a first pivot pin rotatable with the first wing between the stowed position and the deployed position with the first pivot pin having an opening that is aligned with and adjacent to the first fork, a first lever pin within the opening in the first pivot pin and extending out from the opening in the first pivot pin to be located within the first fork on the first arm with the first lever pin being rotatable with the first wing and the first pivot pin so that the first lever pin is disengaged from the first fork when in the stowed position and is engaged with the first fork when in the deployed position. A top portion of the first lever pin is between prongs of the first fork with the top portion of the first lever pin having an elongated shape with two opposed flat sides that result in clearance between the first lever pin and the prongs of the first fork when the first lever pin is disengaged from the first fork and a close fit between the first lever pin and the prongs of the first fork when the first lever pin is engaged with the first fork. Furthermore, the flight vehicle also includes a first wing tip shaft within the first wing and connected to the first lever pin at a first end and to a first aileron at a second end with the first wing tip shaft configured to rotate to control the first aileron when the first fork of the bell crank moves the first lever pin within the opening in the first pivot pin. The flight vehicle further includes a second pivot pin rotatable with the second wing between the stowed position and the deployed position, the second pivot pin having an opening that is aligned with and adjacent to the second fork, a second lever pin within the opening in the second pivot pin and extending out from the opening in the second pivot pin to be located within the second fork on the second arm with the second lever pin being rotatable with the second wing and second pivot pin so that the second lever pin is disengaged from the second fork when in the stowed position and is engaged with the second fork when in the deployed position, and a second wing tip shaft within the second wing and connected to the second lever pin at a first end and to a second aileron at a second end with the second wing tip shaft configured to rotate to control the second aileron when the second fork of the bell crank moves the second lever pin within the opening in the second pivot pin.

Another embodiment of an aileron actuation system for a flight vehicle can include a first pivot pin having a hollow cylindrical shape with an opening therein, a second pivot pin having a hollow cylindrical shape with an opening therein, a first deployable wing configured to pivot about the first pivot pin between a stowed position and a deployed position with the first deployable wing having a first wing tip shaft extending between the first pivot pin and a first aileron at a tip of the first deployable wing, a second deployable wing configured to pivot about the second pivot pin between the stowed position and the deployed position with the second deployable wing having a second wing tip shaft extending between the second pivot pin and a second aileron at a tip of the second deployable wing, a first lever pin within the opening in the first pivot pin with the first lever pin having a first end that extends out from a top of the first pivot pin and a second end connected to the first wing tip shaft and with the first lever pin configured to rotate the first wing tip shaft to control the first aileron, and a second lever pin within the opening in the second pivot pin with the second lever pin having a first end that extends out from a top of the second pivot pin and a second end connected to the second wing tip shaft and with the second lever pin configured to rotate the second wing tip shaft to control the second aileron.

BRIEF DESCRIPTION OF THE DRAWINGS

FIG. 3B is a top perspective view of a portion of the wing tip aileron actuation system with one wing in the stowed position and one wing in the deployed position.

FIG. 3C is a top perspective view of a pivot pin, lever pin, and bell crank fork in the deployed position.

FIG. 3D is a top perspective view of the pivot pin, lever pin, and bell crank fork in the stowed position.

DETAILED DESCRIPTION

Figure 1A:
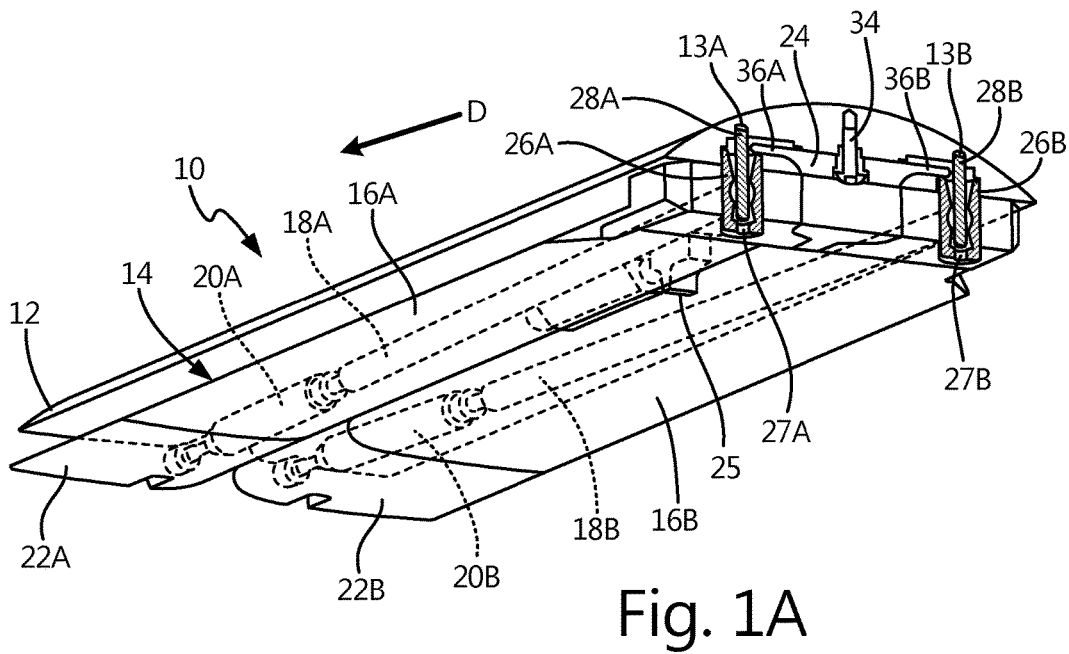
FIG. 1A is a cross-sectional perspective view of a portion of a flight vehicle with wings in a stowed position.

A wing tip aileron actuation system for a flight vehicle is described herein that includes a bell crank that moves two lever pins within respective pivot pins to actuate ailerons on the tips of wings to control the flight of the flight vehicle. The lever pins, pivot pins, and wings are rotatable such that the wings are able to pivot about the pivot pins between a stowed position, in which the wings are within a housing of the flight vehicle, and a deployed position, in which the wings extend outward from the housing of the flight vehicle. Because the lever pins have an elongated shape so that the lever pins intimately engage the bell crank only when the wings are in the deployed position, the bell crank engages the lever pins to actuate the ailerons when the wings are in the deployed position. Each lever pin is collinear with the corresponding pivot pin when the wing is stowed, so the lever pin rotates with no displacement and accompanies the rotation of the corresponding wing and pivot pin. The diameter of the lever pin is a close fit to the fork in the bell crank so that the fork can displace the lever pin with very little backlash. Since the lever pin rotates when the wing deploys, an end of the lever pin adjacent the fork of the bell crank can have an elongated shape that is flat on two opposite sides. The elongated configuration of the lever pin can be configured such that when the wing, pivot pin, and lever pin are in the stowed position, the orientation of the lever pin is such that the flat sides are facing prongs of the fork resulting in substantial clearance (i.e., a space/gap) between the lever pin and fork. If the wing tip aileron actuation system is subjected to high shock loads when the wing are stowed, such as during deployment of the flight vehicle, the lever pin will not contact and possibly damage the fine fitting surfaces of the fork of the bell crank. When the wing deploys, the lever pin rotates about the axis of the lever pin and the pivot pin such that the flat sides of the elongated lever pin rotate so as to be facing away from the prongs of the fork. With the flat sides of the lever pin facing away from the prongs of the fork, the elongated configuration puts the lever pin in close proximity with the prongs of the fork such that there is no space/gap between the lever pin and the fork (i.e., the lever pin is in contact with the fork of the bell crank). Further, the housing of the flight vehicle can include a slot corresponding to each lever pin into which the end of the lever pin extends to prevent the aileron on the tip of the wing from actuating when the wing is in the stowed or nearly stowed position. With the slot preventing each lever pin from movement when the wings are in the stowed position, the slot prevents each lever pin from swinging out of engagement with each fork of the bell crank prior to full deployment of the wings (i.e., the slot ensures each lever pin remains within the prongs of each fork and does not swing so as to be outside of the prongs when the wings are in the deployed position). The slot has an elongated shape that is oriented to be approximately parallel a direction of flight of the flight vehicle to prevent movement of the lever pin when the wing is in the stowed position while allowing forward and rearward movement of the lever pin when the wing is in the deployed position (i.e., the end of the lever pin is constrained by the slot in the housing from movement that is perpendicular to the direction of flight while being unconstrained by the slot in the housing in a direction that is parallel to the direction of flight). The wing tip aileron actuation system can include an actuator that rotates the bell crank about a pivot point to move the lever pins.

The use of the wing tip aileron actuation system that is able to accommodate wings that pivot between the stowed position and the deployed position has many benefits. The system is simple and includes very few components, with the bell crank interacting with lever pins within pivot pins, which in turn interact with wing tip shafts that are connected to the ailerons. The wing tip aileron actuation system requires only one actuator or similar component to pivot the bell crank. The system is rugged and able to handle the extreme forces sustained by the flight vehicle during launch and flight because the components are close-fitted but also have sufficient room to move and vibrate without becoming separated from one another or damaging one another. Because the wing tip aileron actuation system is simple and rugged, the system is more reliable by being less prone to damage and malfunction. The system is also inexpensive, as the materials used to construct the bell crank, lever pins, pivot pins, wing tip shafts, wings, and other components can be common, inexpensive materials, such as plastics, composites, alloys, or other materials. Further, the shape of the components of the wing tip aileron actuation system is simple such that molding and/or machining of these components is not burdensome. The system is able to accommodate a configuration in which the wing tip shafts do not extend away from the pivot pins at the same angle as the wings. Because the wing tip aileron actuation system is able to be used with wings that pivot between the stowed position and the deployed position, the system can be used with a variety of flight vehicles, including glide bombs and precision guided munitions. These benefits and more will be realized after review of the description below.

Figure 1B:
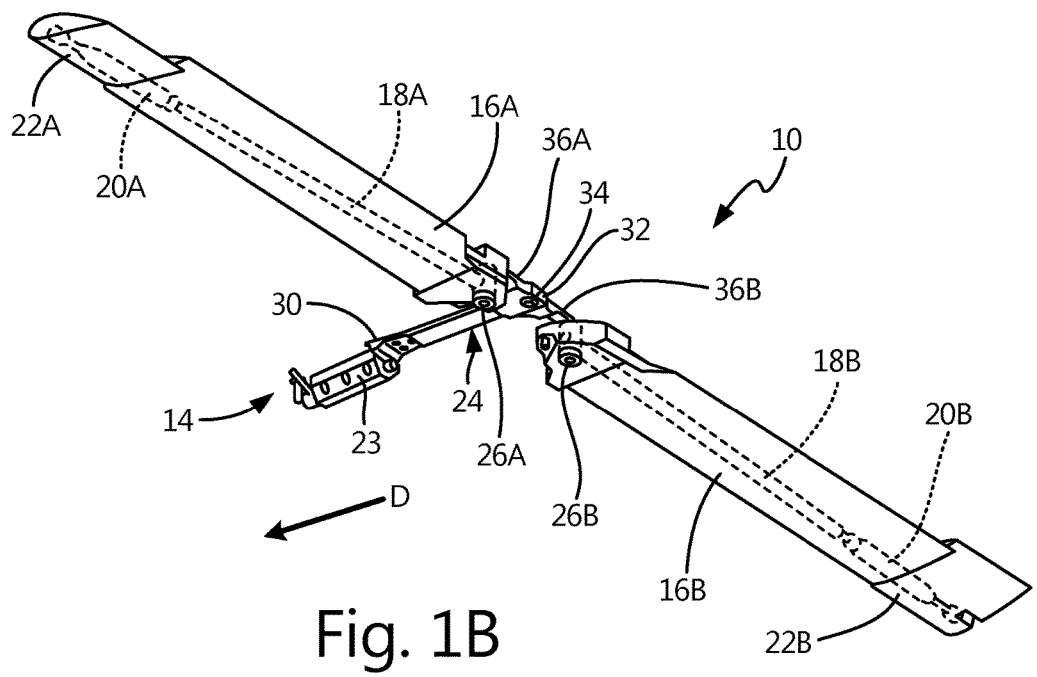
FIG. 1B is a bottom perspective view of a wing tip aileron actuation system with wings in a deployed position.

FIG. 1A is a cross-sectional perspective view of a portion of flight vehicle with wings in a stowed position, while FIG. 1B a bottom perspective view of a wing tip aileron actuation system with wings in a deployed position. Flight vehicle 10 includes housing 12 (only a portion of housing 12 is shown) with first slot 13A and second slot 13B. Flight vehicle 10 also includes wing tip aileron actuation system 14, with wings 16 (first wing 16A and second wing 16B) being in a stowed position in FIG. 1A and a deployed position in FIG. 1B. Wing 16 include wing tip shafts 18 (first wing tip shaft 18A and second wing tip shaft 18B), pivot shafts 20 (first pivot shaft 20A and second pivot shaft 20B), and ailerons 22 (first aileron 22A and second aileron 22B). Wing tip aileron actuation system 14 includes actuator 23, bell crank 24 (with protrusion 25), pivot pins 26 (first pivot pin 26A with first opening 27A and second pivot pin 26B and second opening 27B), and lever pins 28 (first lever pin 28A and second lever pin 28B). Bell crank 24 has protrusion 25, first end 30, second end 32, pivot point 34, arms 36 (first arm 36A and second arm 36B), and forks 38 (first fork 38A and second fork 38B). Flight vehicle 10 moves in a direction of flight D.

Flight vehicle 10 can be any flight vehicle in which wings 16 are designed to be deployable from the stowed position (as shown in FIG. 1A) to the deployed position (as shown in FIG. 1B). Flight vehicle 10 can be a smaller flight vehicle, such as a glide bomb or precision guided munition, that experiences large forces during launch and is destroyed upon impact at the end of the flight. Therefore, having components that are relatively inexpensive to manufacture and that are able to handle large forces is important. The components of flight vehicle 10 can be constructed from a variety of materials depending on the strength and rigidity needs.

Housing 12 surrounds and protects the internal components of flight vehicle 10, including wing tip aileron actuation system 14 and wings 16 when wings 16 are in the stowed position. Housing 12 can be made from one or a variety of materials, including aluminum, and provides aerodynamics and structural stability to flight vehicle 10. Housing 12 includes first slot 13A and second slot 13B, which are apertures in an internal side of housing 12 to provide a slot into which ends of first lever pin 28A and second lever pin 28B extend into, respectively. First slot 13A and second slot 13B hold a top end of lever pins 28 in place (preventing lever pins 28 from movement other than rotational movement) when wings 16 are in the stowed position to prevent ailerons 22 from moving within housing 12.

In FIG. 1A, wings 16 (first wing 16A and second wing 16B) are in the stowed position and are parallel to one another within housing 12. In the stowed position, wings 16 are also parallel to the direction of flight D. In FIG. 1B, wings 16 are in the deployed position and in a position that is approximately ninety degrees from wings 16 in the stowed position (i.e., approximately perpendicular to the direction of flight D). Wings 16 are configured so as to rotate about pivot pins 26 between the stowed position and the deployed position (first wing 16A rotates about first pivot pin 26A and second wing 16B rotates about second pivot pin 26B in an opposite direction than the rotation of first wing 16A). When in the stowed position, wings 16 are within housing 12, causing flight vehicle 10 to be more compact and more easily launched from a munitions bay without wings 16 becoming damaged or otherwise obstructing the launch. After launch, wings 16 are deployed by rotating approximately ninety degrees outward to provide a flight surface, with ailerons 22 at the tips of wings 16, to control the flight of flight vehicle 10. More specifically, ailerons 22 help control the roll of flight vehicle 10 in flight.

Wing tip shafts 18 (first wing tip shaft 18A and second wing tip shaft 18B) and pivot shafts 20 (first pivot shaft 20A and second pivot shaft 20B) are within wings 16 between pivot pins 24 and ailerons 22. Wing tip shafts 18 and pivot shafts 20 connect lever pins 28, which are within pivot pins 26, to ailerons 22 and transfer the rotational force between lever pins 28 and ailerons 22. Wing tip shafts 18 are connected to lever pins 28 and extend out from a hole in pivot pins 26 along wings 16. Wing tip shafts 18 can extend within wings 16 at an angle that is parallel to wings 16, can extend in a slightly forward direction (as shown in FIG. 2C), or can extend at another angle. Wing tip shafts 18 extend along a majority of a length of wings 16 to connect to pivot shafts 20, which connect wing tip shafts 18 to ailerons 22. Pivot shafts 20 can extend at a same angle as wing tip shafts 18, or pivot shafts 20 can extend at a different angle. Wing tip shafts 18 are connected to pivot shafts 20 in such a way as to allow rotational force to be transferred from wing tip shafts 18 to pivot shafts 20 and eventually to ailerons 22 to rotate/actuate ailerons 22. Pivot shafts 20, whether separate from or integral with wing tip shafts 18, are a bridge between wings 16 and ailerons 22 to provide structural support against bending to support ailerons 22. In other embodiments, wings 16 may include a configuration in which wing tip shafts 18 and/or pivot shafts 20 are not present and the rotational force is transferred from lever pins 28 to ailerons 22 by other means.

Wing tip aileron actuation system 14 controls/actuates ailerons 22 while also allowing wings 16 to rotate between the stowed position and the deployed position. Wing tip aileron actuation system 14 is fully contained within flight vehicle 10, includes relatively few components, and has little weight, which increases the reliability and efficiency of flight vehicle 10.

Actuator 23 is located within housing 12 of flight vehicle 10 and is configured to rotate a pinion with teeth to move first end 30 of bell crank 24. Actuator 23 can be a motor or have another configuration to move bell crank 24. Actuator 23 can be attached to a computer system onboard flight vehicle 10, which instructs actuator 23 to rotate to move bell crank 24 (to pivot lever pins 28 to move ailerons 22) depending on the flight path of flight vehicle 10.

Bell crank 24 extends between actuator 23 and pivot pins 26 to pivot lever pins 28. Bell crank 24 interacts with actuator 23 at first end 30 and rotates about pivot point 34 at second end 32. Extending from second end 32 so that bell crank 24 has is substantially "T" shaped are arms 36 (first arm 36A and second arm 36B). On each of arms 36 are forks 38 (first fork 38A and second fork 38B as shown in FIGS. 3C and 3D), which are ends that each have two prongs to form an notch that is configured to interact with lever pins 28. First end 30 of bell crank 24 can have teeth that engage teeth on actuator 23, and first end 30 is configured to move to pivot bell crank 24 about pivot point 34. First end 30 can be a rod that extends between actuator 23 and pivot point 34, or first end 30 can have another configuration to allow actuator 23 to pivot bell crank 24 about pivot point 34. Pivot point 34 can be a bolt and nut, a rivet, a screw, or another configuration that attaches second end 32 of bell crank 24 to housing 12 (or another structural component) and allows bell crank 24 to rotate without providing a large resistance to rotation. Pivot point 34 is located at second end 32 between arms 36, which extend outward from second end 32 and pivot point 34 to be adjacent to pivot pins 26 and lever pins 28. First fork 38A is at an end of first arm 36A that is opposite an end adjacent pivot point 34, and second fork 38B is at an end of second arm 36B that is opposite an end adjacent pivot point 34. First fork 38A of first arm 36A is adjacent to first lever pin 28A, while second fork 38B of second arm 36B is adjacent to second lever pin 28B. When in the deployed position, lever pins 28 are in contact with forks 38 of bell crank 24 such that movement of forks 38 causes movement of lever pins 28. Bell crank 24 can be one continuous and monolithic component manufactured from the same material, or bell crank 24 can be constructed from multiple pieces and/or materials that are fastened together through various means. Additionally, while bell crank 24 is shown as having a substantially "T" shape, bell crank 24 can have other shapes and configurations to transfer forces from actuator 23 to lever pins 28. Bell crank 24 can have protrusion 25 or another component that is held between wings 16 when in the stowed position to prevent bell crank 24 from moving side to side during launch of flight vehicle 10 so that forks 38 of bell crank 24 do not contact lever pins 28.

Pivot pins 26 (first pivot pin 26A adjacent first wing 16A and second pivot pin 26B adjacent first wing 16B) are located at inner ends of wings 16 and allow first wing 16A and second wing 16B to rotate about first pivot pin 26A and second pivot pin 26B, respectively, from the stowed position to the deployed position. Pivot pins 26 can be constructed from any material and are secured and prevented from nonrotational movement by housing 12. Pivot pins 26 are rotatable with wings 16. Pivot pins 26 have a hollow cylindrical shape that forms openings 27 with first opening 27A in first pivot pin 26A and second opening 27B in second pivot pin 26B. Lever pins 28 extend through openings 27 to interact with an end of wing tips shafts 18 and forks 38 (as shown in FIGS. 2A, 3B, 3C, and 3D) of bell crank 24. Each of openings 27 in pivot pins 26 have a substantially hourglass cross-sectional shape in which lever pins 28 pivot within, and openings 27 are wider in a direction that is perpendicular to wing tip shafts 18 and also perpendicular to the direction of flight D of flight vehicle 10 when wings 16 are in the stowed position (as shown in FIG. 3D). After pivot pins 28 rotate with wings 16 from the stowed position to the deployed position, openings 27 are wider in a direction that is parallel to the direction of flight D of flight vehicle 10 (as shown in FIG. 3C). Pivot pins 26 each also include a hole in a side through which an end of wing tip shafts 18 extends to connect to lever pins 28. With wings tip shafts 18 extending into pivot pins 26, this engagement causes pivot pins 26 to rotate with wings 16 and wings tip shafts 18.

Lever pins 28 (first lever pin 28A within first opening 27A in first pivot pin 26A and second lever pin 28B within second opening 27B in second pivot pin 28B) are rods with an elongated cross-sectional shape with opposite flat sides/ surfaces (as shown in FIGS. 3C and 3D). Lever pins 28 have a top end that extends out of openings 27 to be located within forks 38 and engage forks 38 when wings 16, pivot pins 26, and lever pins 28 have rotated into the deployed position. Lever pins 28 have a bottom end that extends through openings 27 and attach to the end of wing tips shafts 18, which are within pivot pins 26. In the deployed position, forks 38 are in contact with and configured to move the top ends of lever pins 28 to pivot lever pins 28 about the end of wing tips shafts 18. The pivoting of lever pins 28 causes wing tip shafts 18 to rotate, which in turn causes ailerons 22 to actuate to control the flight of flight vehicle 10. However, in the stowed position, forks 38 are not in contact with the top ends of lever pins 28 (due to the rotation of wings 16, pivot pins 26, and lever pins 28 and lever pins 28 having an elongated cross-sectional shape) and therefore bell crank 24 cannot move lever pins 28 to actuate ailerons 22. Lever pins 28 can be constructed from a variety of materials, but lever pins 28 should have sufficient strength and rigidity to transfer force between bell crank 24 and wing tip shafts 18.

In FIG. 1B, ailerons 22 are actuated with first aileron 22A tilted downwards and second aileron 22B tilted upwards. Because wing tip aileron actuation system 14 controls the roll of flight vehicle 10 in flight, first aileron 22A and second aileron 22B tilt in opposite directions (to roll flight vehicle 10 in either direction). Thus, only one actuator 23 and one bell crank 24 is needed to move lever pins 28 as first lever pin 28A and second lever pin 28B move in unison and do not move independent from one another. However, other embodiments can include a configuration in which first lever pin 28A moves independently from second lever pin 28B such that the actuation/control of first aileron 22A is not affected by the actuation/control of second aileron 22B.

Figure 2A:
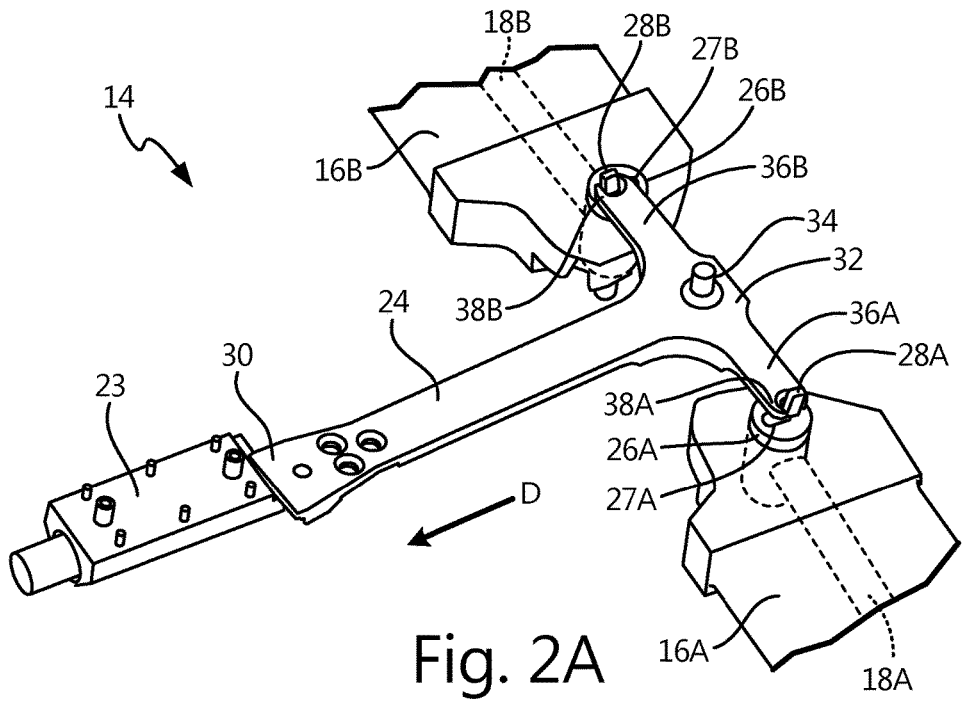
FIG. 2A is a top perspective view of a portion of the wing tip aileron actuation system with the ailerons actuated.
Figure 2B:
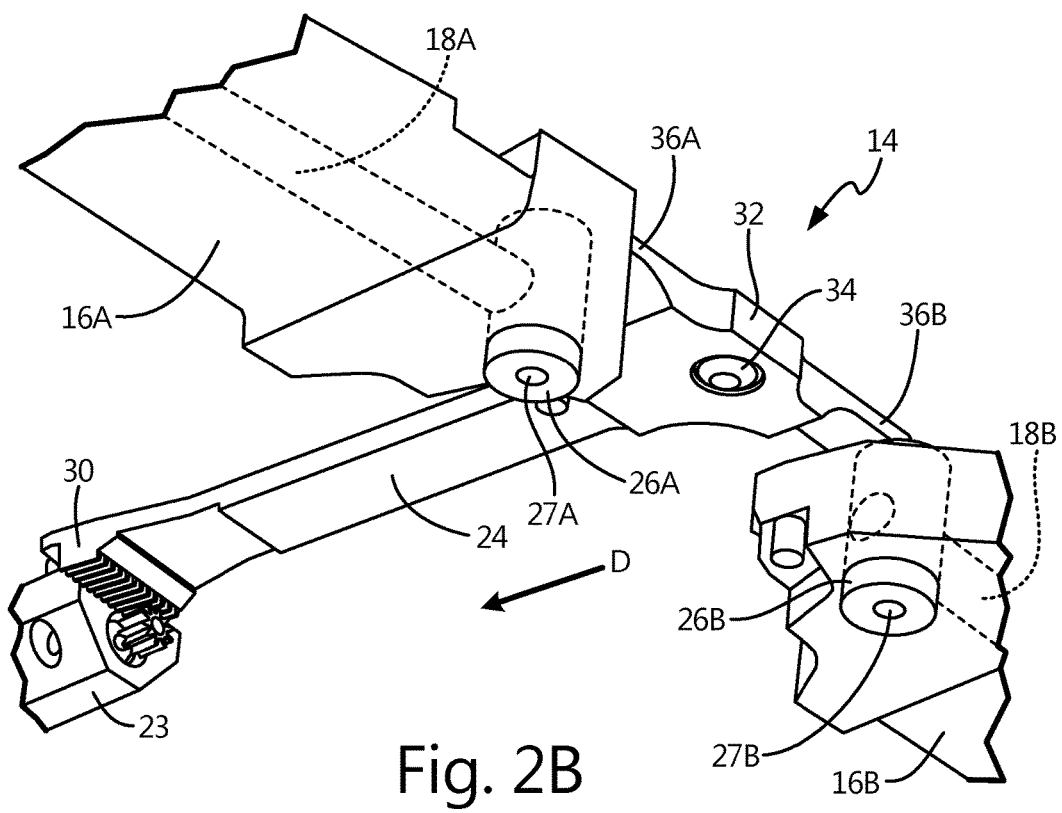
FIG. 2B is a bottom perspective view of a portion of the wing tip aileron actuation system with the ailerons actuated.
Figure 2C:
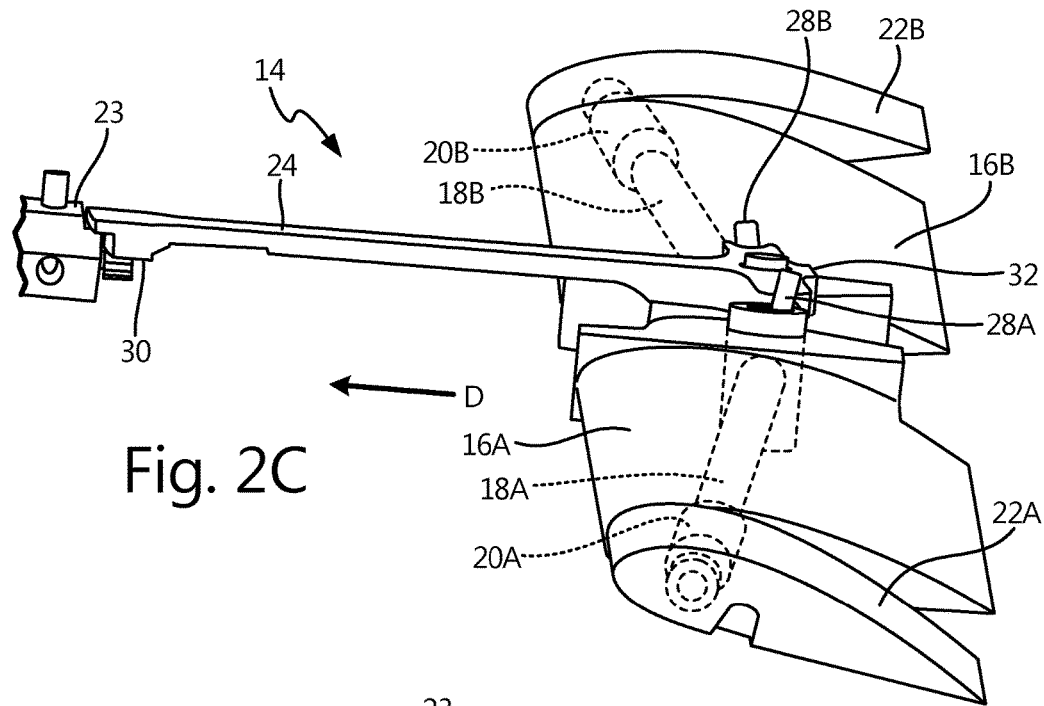
FIG. 2C is a side perspective view of the wing tip aileron actuation system with the ailerons actuated.

FIG. 2A is a top perspective view of a portion of wing tip aileron actuation system 14 with ailerons 22 actuated, FIG. 2B is a bottom perspective view of a portion of wing tip aileron actuation system 14 with ailerons 22 actuated, and FIG. 2C is a side perspective view of wing tip aileron actuation system 14 with ailerons 22 actuated. Wing tip aileron actuation system 14 includes wings 16, wing tip shafts 18, pivot shafts 20, ailerons 22, actuator 23, bell crank 24, pivot pins 26, and lever pins 28. Pivot pins 26 include openings 27, while bell crank 24 includes first end 30, second end 32, pivot point 34, arms 36, and forks 38.

FIGS. 2A, 2B, and 2C show wings 16 in the deployed position with wing tip aileron actuation system 14 actuating ailerons 22 such that first aileron 22A is tilted downwards and second aileron 22B is tilted upwards. To actuate ailerons 22 to tilt ailerons 22 upwards or downwards to control the flight of flight vehicle 10, actuator 23 is instructed by a computer system onboard flight vehicle 10 to rotate a pinion. The pinion has teeth that engage teeth on first end 30 of bell crank 24. Because actuator 23 is stationary with respect to flight vehicle 10 and bell crank 24 is configured to rotate about pivot point 34, the rotation of the pinion of actuator 23 is able to move first end 30 of bell crank 24 from side to side. Alternatively, actuator 23 could be configured to move a cam forward and rearward, with the cam having an angled slot that is engaged by a pin in first end 30 of bell crank 24. As the cam moves forward and rearward, the pin on bell crank 24 tracks within the angled slot in the cam causing first end 30 to be moved from side to side (perpendicular to direction of flight D). Furthermore, the forward and rearward motion of the cam could be affected by a lead screw in line with a motor with the lead screw being engaged in a nut fixed to the cam such that as the motor rotates clockwise and counterclockwise, the cam moves forward and rearward.

The movement of first end 30 of bell crank 24 rotates bell crank about pivot point 34 at second end 32, which in turn moves first arm 36A and second arm 36B. With pivot point 34 being between first arm 36A and second arm 36B, first arm 36A will move in an opposite direction than second arm 36B (i.e., if first end 30 moves to the left as shown in FIGS. 2A, 2B, and 2C, first arm 36A moves rearward and second arm 36B moves forward, and vice-versa if first end 30 moves to the right).

The movement of first arm 36A and second arm 36B moves the top ends of first lever pin 28A (which extends out from first pivot pin 26A) and second lever pin 28B (which extends out from second pivot pin 26B), respectively, because first fork 38A on first arm 36A is in contact with and engages first lever pin 28A and second fork 38B on second arm 36B is in contact with and engages second lever pin 28B (when in the deployed position). The top end of first lever pin 28A moving rearwards (as shown in FIGS. 2A, 2B, and 2C) pivots first lever pin 28A about a point where first lever pin 28A is connected to first wing tip shaft 18A and causes first wing tip shaft 18A to rotate. The rotation of first wing tip shaft 18A in turn rotates first pivot shaft 20A, which causes first aileron 22A to tilt downwards (and vice-versa when the top end of first lever pin 28A is moved forward).

Similarly, the top end of second lever pin 28B moving forward (as shown in FIGS. 2A, 2B, and 2C) pivot second lever pin 28B about a point where second lever pin 28B is connected to second wing tip shaft 18B and causes second wing tip shaft 18B to rotate. The rotation of second wing tip shaft 18B in turn rotates second pivot shaft 20B, which causes second aileron 22B to tilt upwards (and vice-versa when the top end of second lever pin 28B is moved rearward). Thus, wing tip aileron actuation system 14 is able to control the actuation of ailerons 22 by transferring forces between actuator 23 and ailerons 22 by transferring forces from actuator 23 to bell crank 24 to lever pins 28 to wing tip shafts 18 to pivot shafts 20 and finally to ailerons 22.

Wing tip aileron actuation system 14 is able to control ailerons 22 through the subtle movement of first end 30 of bell crank 24. Because first end 30 of bell crank 24 does not need to move a large distance to actuate/control ailerons 22, ailerons 22 are immediately responsive and the time between when actuator 23 is instructed to rotate the pinion and when ailerons 22 tilt is very short. Actuator 23 can be configured such actuator 23 does not have to move ailerons 22 from one extreme (completely up/down) to the other extreme (completely down/up), but rather actuator 23 can move ailerons 22 to any position between a completely up and a completely down position to more accurately control flight vehicle 10. Further, the forces are transferred from actuator 23 to aileron 22 through pivot pins 26 so wings 16 are able to rotate between the stowed position and the deployed position while still allowing wing tip aileron actuation system 14 to actuate ailerons 22.

Figure 3A:
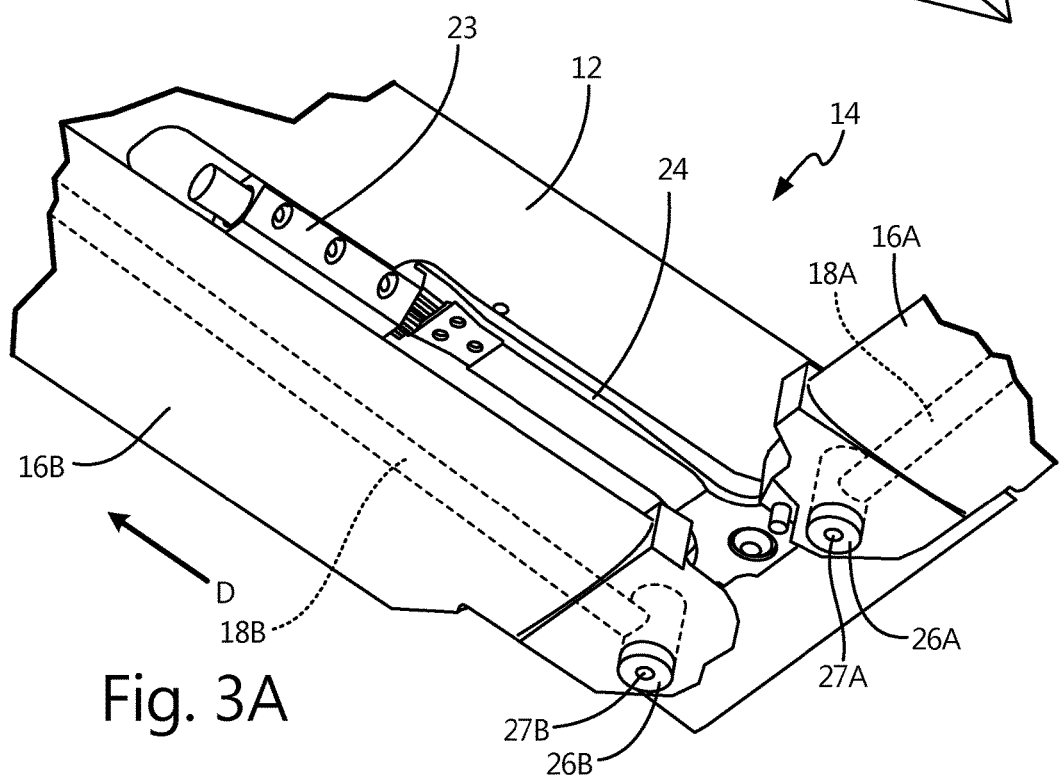
FIG. 3A is bottom perspective view of a portion of the wing tip aileron actuation system with one wing in the stowed position and one wing in a deployed position.

FIG. 3A is bottom perspective view of a portion of wing tip aileron actuation system 14 with first wing 16A in the stowed position and second wing 16B in the deployed position, FIG. 3B is a top perspective view of a portion of wing tip aileron actuation system 14 of FIG. 3A, FIG. 3C is a top perspective view of second pivot pin 26B, second lever pin 28B, and bell crank 24 in the deployed position, and FIG. 3D is a top perspective view of first pivot pin 26A, first lever pin 28A, and bell crank 24 in the stowed position. A configuration in which one wing 16 is in the deployed position and the other wing 16 is in the stowed position is unlikely because wings 16 of flight vehicle 10 will usually be deployed simultaneously. However, the configuration as shown in FIGS. 3A, 3B, 3C, and 3D is intended to show the difference in orientation between components that are in the deployed position and those that are in the stowed position. Specifically, to show the difference between a lever pin 28 that is in the deployed position (as shown in FIG. 3C) and a lever pin 28 that is in the stowed position (as shown in FIG. 3D).

When wings 16 are in the stowed position, wings 16 are within housing 12, and pivot pins 26 and lever pins 28 are positioned such that the elongated cross-sectional shape of lever pins 28 (and the elongated cross-sectional shape of a top of openings 27) are perpendicular to the direction of flight D of flight vehicle 10 (shown in FIG. 3D). With the elongated cross-sectional shape of lever pins 28 having this orientation, lever pins 28 are not in contact with forks 38 as shown in FIG. 3D and movement of bell crank 24 does not cause lever pins 28 to move which in turn does not cause ailerons 22 to actuate. As stated above, slots 13 in housing 12 (as shown in FIG. 1A) have an elongated shape that constrains the top end of lever pins 28 from nonrotational movement to prevent ailerons 22 from actuation when wings 16 are in the stowed or near stowed position. When wings 16 are in the deployed position, wings 16 extend outward from housing 12 in a direction that is perpendicular to the direction of flight D of flight vehicle 10. Further, in the deployed position, wings 16, pivot pins 26, and lever pins 28 are positioned such that the elongated cross-sectional shape of lever pins 28 (and the elongated cross-sectional shape of openings 27) are parallel to the direction of flight D of flight vehicle 10. With the elongated cross-sectional shape of lever pins 28 having this orientation, lever pins 28 are in contact with forks 38 (as shown in FIG. 3C) and movement of bell crank 24 causes the top end of lever pins 28 to move which in turn causes ailerons 22 to actuate. As stated above, slots 13 in housing 12 (as shown in FIG. 1A) have an elongated shape that allows the top end of lever pins 28 to move to allow lever pins 28 to actuation ailerons 22 when wings 16 are in the deployed position. Bell crank 24 can have protrusion 25 or another component that is held between wings 16 in the stowed position, preventing bell crank 24 from moving side to side during launch to prevent forks 38 from contacting lever pins 28.

While not shown in FIG. 3C or 3D, the top ends of first lever pin 28A and second lever pin 28B are located within first slot 13A and second slot 13B (as shown in FIG. 1A), respectively. First slot 13A and second slot 13B are configured to prevent first lever pin 28A and second lever pin 28B from movement when wings 16, pivot pins 26, and lever pins 28 are in the stowed position so as to prevent ailerons 22 from moving out of a neutral position (i.e., not tilted upwards or downwards) until ailerons 22 are in the deployed position. First slot 13A and second slot 13B can have an elongated shape that allows lever pins 28 to move forward and rearward but does not allow lever pins 28 to move in a direction that is perpendicular to the direction of flight D of flight vehicle 10.

Wing tip aileron actuation system 14 for flight vehicle 10 includes bell crank 24 that moves lever pins 28 within openings 27 in pivot pins 26 to actuate ailerons 22 on the tips of wings 16 to control the flight of flight vehicle 10. Lever pins 28, pivot pins 26, and wings 16 are rotatable such that wings 16 are able to pivot about pivot pins 26 between the stowed position, in which wings 16 are within housing 12 of flight vehicle 10, and the deployed position, in which wings 16 extend outward from housing 12 of flight vehicle 10 approximately perpendicular to the direction of flight D. Because lever pins 28 have an elongated cross-sectional shape, lever pins 28 engage forks 38 on arms 36 of bell crank 24 only when wings 16 are in the deployed position. Bell crank 24 is able to move lever pins 28 to actuate ailerons 22 only when wings 16 are in the deployed position because ailerons 22 are kept in line with the rest of wings 16 until wings 16 are deployed. Wing tip aileron actuation system 14 can include actuator 23 that rotates bell crank 24 about pivot point 34 to move lever pins 28.

The ability for wing tip aileron actuation system 14 to accommodate wings 16 that pivot between the stowed position and the deployed position has many benefits. Wing tip aileron actuation system 14 is simple and includes very few components, with bell crank 24 interacting with lever pins 28 within pivot pins 26, which in turn interact with wing tip shafts 18 that are connected to ailerons 22 (through pivot shafts 20). Wing tip aileron actuation system 14 requires only one actuator 23 or similar component to pivot bell crank 24. Wing tip aileron actuation system 14 is rugged and able to handle the extreme forces sustained by flight vehicle 10 during launch and flight because the components are close-fitted but also have sufficient room to move and vibrate without becoming separated from one another or damaging one another. Because wing tip aileron actuation system 14 is simple and rugged, wing tip aileron actuation system 14 is more reliable by being less prone to damage and malfunction. Wing tip aileron actuation system 14 is also inexpensive, as the materials used to construct bell crank 24, lever pins 28, pivot pins 26, wing tip shafts 18, pivot shafts 20, and wings 16 can be common, inexpensive materials. Further, the shape of the components of wing tip aileron actuation system 14 is simple such that molding and/or machining of these components is not burdensome. Wing tip aileron actuation system 14 is able to accommodate a configuration in which wing tip shafts 18 do not extend away from pivot pins 26 at the same angle as wings 16. Because wing tip aileron actuation system 14 is able to be used with wings 16 that pivot between the stowed position and the deployed position, wing tip aileron actuation system 14 can be used with a variety of flight vehicles, including glide bombs and precision guided munitions.

Discussion of Possible Embodiments

The following are non-exclusive descriptions of possible embodiments of the present invention.

A flight vehicle includes first and second wings configured to be contained within a housing when in a stowed position and extend outward from the housing when in a deployed position, an actuator, and a bell crank. The bell crank has a first end connected to the actuator, a pivot point at a second end, and first and second arms extending outward from the second end with the first arm having a first fork and the second arm having a second fork. The flight vehicle also includes a first pivot pin rotatable with the first wing between the stowed position and the deployed position with the first pivot pin having an opening that is aligned with and adjacent to the first fork, a first lever pin within the opening in the first pivot pin and extending out from the opening in the first pivot pin to be located within the first fork on the first arm with the first lever pin being rotatable with the first wing and the first pivot pin so that the first lever pin is disengaged from the first fork when in the stowed position and is engaged with the first fork when in the deployed position, and a first wing tip shaft within the first wing and connected to the first lever pin at a first end and to a first aileron at a second end with the first wing tip shaft configured to rotate to control the first aileron when the first fork of the bell crank moves the first lever pin within the first pivot pin. The flight vehicle further includes a second pivot pin rotatable with the second wing between the stowed position and the deployed position, the second pivot pin having an opening that is aligned with and adjacent to the second fork, a second lever pin within the opening in the second pivot pin and extending out from the opening in the second pivot pin to be located within the second fork on the second arm with the second lever pin being rotatable with the second wing and second pivot pin so that the second lever pin is disengaged from the second fork when in the stowed position and is engaged with the second fork when in the deployed position, and a second wing tip shaft within the second wing and connected to the second lever pin at a first end and to a first aileron at a second end with the second wing tip shaft configured to rotate to control the second aileron when the second fork of the bell crank moves the second lever pin within the second pivot pin.

The flight vehicle of the preceding paragraph can optionally include, additionally and/or alternatively, any one or more of the following features, steps, configurations, and/or additional components:

A first slot in the housing into which an end of the first lever pin extends and a second slot in the housing into which an end of the second lever pin extends.

The first slot and the second slot each have an elongated cross section oriented parallel to the first wing tip shaft and the second wing tip shaft, respectively, when in the stowed position configured to prevent nonrotational movement of a top end the first lever pin and a top end the second lever pin when in the stowed position and configured to allow nonrotational movement of the top end of the first lever pin and the top end of the second lever pin along the first slot and second slot, respectively, when the first wing tip shaft and the second wing tip shaft are in the deployed position.

The first slot and the second slot are configured to ensure the top end of the first lever pin remains within the first fork and the top end of the second lever pin remains within the second fork when the first wing and the second wing move from the stowed position to the deployed position.

The first lever pin and the second lever pin each have a cross section that is elongated so that the first lever pin is in contact with the first fork and the second pin is in contact with the second fork when in the deployed position and the first lever pin is not in contact with the first fork and the second pin is not in contact with the second fork when in the stowed position.

The first lever pin pivots about the first end of the first wing tip shaft within the opening in the first pivot pin to rotate the first wing tip shaft.

The second lever pin pivots about the first end of the second wing tip shaft within the opening in the second pivot pin to rotate the second wing tip shaft.

The first wing tip shaft extends within the first wing nonparallel to the first wing.

The second wing tip shaft extends within the second wing nonparallel to the second wing.

The actuator is configured to pivot the bell crank about the pivot point to move the first lever pin adjacent to the first fork on the first arm and the second lever pin adjacent to the second fork on the second arm.

The bell crank is configured to pivot to move the first lever pin in an opposite direction from the second lever pin to control the roll of the flight vehicle.

The first aileron is located at a tip of the first wing and the second aileron is located at a tip of the second wing.

The actuator includes a motor and pinion with teeth that mate with teeth on the first end of the bell crank.

A first pivot shaft within the first wing and attached at a first end of the first pivot shaft to the second end of the first wing tip shaft and at a second end of the first pivot shaft to the first aileron and a second pivot shaft within the second wing and attached at a first end of the second pivot shaft to the second end of the second wing tip shaft and at a second end of the second pivot shaft to the second aileron.

The first pivot pin is cylindrical in shape and the second pivot pin is cylindrical in shape.

The opening in the first pivot pin has a substantially hourglass cross-sectional shape to allow the first lever pin to pivot within the first pivot pin about the first end of the first wing tip shaft, and wherein the opening in the second pivot pin has a substantially hourglass cross-sectional shape to allow the second lever pin to pivot within the second pivot pin about the first end of the second wing tip shaft.

A control system for a flight vehicle includes a first pivot pin having a hollow cylindrical shape with an opening therein, a second pivot pin having a hollow cylindrical shape with an opening therein, a first deployable wing configured to pivot about the first pivot pin between a stowed position and a deployed position with the first deployable wing having a first wing tip shaft extending between the first pivot pin and a first aileron at a tip of the first deployable wing, a second deployable wing configured to pivot about the second pivot pin between the stowed position and the deployed position with the second deployable wing having a second wing tip shaft extending between the second pivot pin and a second aileron at a tip of the second deployable wing, a first lever pin within the opening in the first pivot pin with the first lever pin having a first end that extends out from a top of the first pivot pin and a second end connected to the first wing tip shaft and with the first lever pin configured to rotate the first wing tip shaft to control the first aileron, and a second lever pin within the opening in the second pivot pin with the second lever pin having a first end that extends out from a top of the second pivot pin and a second end connected to the second wing tip shaft and with the second lever pin configured to rotate the second wing tip shaft to control the second aileron.

The control system of the preceding paragraph can optionally include, additionally and/or alternatively, any one or more of the following features, steps, configurations, and/or additional components:

A bell crank with a first arm adjacent to the first end of the first lever pin and a second arm adjacent to the first end of the second lever pin, the bell crank configured to move the first end of the first lever pin to rotate the first wing tip shaft and to move the first end of the second lever pin to rotate the second wing tip shaft when the first deployable wing and the second deployable wing are in the deployed position.

An actuator connected to the bell crank and configured to pivot the bell crank about a pivot point to move the first arm and the second arm of the bell crank.

The first deployable wing, the first pivot pin, and the first lever pin are configured to rotate from the stowed position to the deployed position so that the first lever pin is in contact with the first arm of the bell crank when in the deployed position and is not in contact with the first arm of the bell crank when in the stowed position, and wherein the second deployable wing, the second pivot pin, and the second lever pin are configured to rotate from the stowed position to the deployed position so that the second lever pin is in contact with the second arm of the bell crank when in the deployed position and is not in contact with the second arm of the bell crank when in the stowed position.

The first lever pin has an elongated cross-sectional shape configured to be in contact with a first fork on the first arm of the bell crank when in the deployed position and provide clearance between the first lever pin and the first fork when in the stowed position and the second lever pin has an elongated cross-sectional shape configured to be in contact with a second fork on the second arm of the bell crank when in the deployed position and provide clearance between the second lever pin and the second fork when in the stowed position.

Any relative terms or terms of degree used herein, such as "substantially," "essentially," "generally," "approximately," and the like should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations; incidental alignment variations; alignment or shape variations induced by thermal, rotational, or vibrational operational conditions; and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flight vehicle comprising:
   first and second wings configured to be contained within a housing when in a stowed position and extend outward from the housing when in a deployed position;
   an actuator;
   a bell crank having a first end connected to the actuator, a pivot point at a second end, and first and second arms extending outward from the second end with the first arm having a first fork and the second arm having a second fork;
   a first pivot pin rotatable with the first wing between the stowed position and the deployed position, the first pivot pin having an opening that is aligned with and adjacent to the first fork;
   a first lever pin within the opening in the first pivot pin and extending out from the opening in the first pivot pin to be located within the first fork on the first arm, the first lever pin rotatable with the first wing and the first pivot pin so that the first lever pin is disengaged from the first fork when in the stowed position and is engaged with the first fork when in the deployed position;
   a first wing tip shaft within the first wing and connected to the first lever pin at a first end and to a first aileron at a second end, the first wing tip shaft configured to rotate to control the first aileron when the first fork of the bell crank moves the first lever pin within the first pivot pin;
   a second pivot pin rotatable with the second wing between the stowed position and the deployed position, the second pivot pin having an opening that is aligned with and adjacent to the second fork;
   a second lever pin within the opening in the second pivot pin and extending out from the opening in the second pivot pin to be located within the second fork on the second arm, the second lever pin rotatable with the second wing and second pivot pin so that the second lever pin is disengaged from the second fork when in the stowed position and is engaged with the second fork when in the deployed position; and
   a second wing tip shaft within the second wing and connected to the second lever pin at a first end and to a second aileron at a second end, the second wing tip shaft configured to rotate to control the second aileron when the second fork of the bell crank moves the second lever pin within the second pivot pin.

2. The flight vehicle of claim 1, further comprising:
   a first slot in the housing into which an end of the first lever pin extends; and
   a second slot in the housing into which an end of the second lever pin extends.

3. The flight vehicle of claim 2, wherein the first slot and the second slot each have an elongated cross section oriented parallel to the first wing tip shaft and the second wing tip shaft, respectively, when in the stowed position configured to prevent nonrotational movement of a top end the first lever pin and a top end the second lever pin when in the stowed position and configured to allow nonrotational movement of the top end of the first lever pin and the top end of the second lever pin along the first slot and second slot, respectively, when the first wing tip shaft and the second wing tip shaft are in the deployed position.

4. The flight vehicle of claim 2, wherein the first slot and the second slot are configured to ensure the top end of the first lever pin remains within the first fork and the top end of the second lever pin remains within the second fork when the first wing and the second wing move from the stowed position to the deployed position.

5. The flight vehicle of claim 1, wherein the first lever pin and the second lever pin each have a cross section that is elongated so that the first lever pin is in contact with the first fork and the second pin is in contact with the second fork when in the deployed position and the first lever pin is not in contact with the first fork and the second pin is not in contact with the second fork when in the stowed position.

6. The flight vehicle of claim 1, wherein the first lever pin pivots about the first end of the first wing tip shaft within the opening in the first pivot pin to rotate the first wing tip shaft and the second lever pin pivots about the first end of the second wing tip shaft within the opening in the second pivot pin to rotate the second wing tip shaft.

7. The flight vehicle of claim 1, wherein the first wing tip shaft extends within the first wing nonparallel to the first wing.

8. The flight vehicle of claim 1, wherein the second wing tip shaft extends within the second wing nonparallel to the second wing.

9. The flight vehicle of claim 1, wherein the actuator is configured to pivot the bell crank about the pivot point to move the first lever pin adjacent to the first fork on the first arm and the second lever pin adjacent to the second fork on the second arm.

10. The flight vehicle of claim 9, wherein the bell crank is configured to pivot to move the first lever pin in an opposite direction from the second lever pin to control the roll of the flight vehicle.

11. The flight vehicle of claim 1, wherein the first aileron is located at a tip of the first wing and the second aileron is located at a tip of the second wing.

12. The flight vehicle of claim 1, wherein the actuator includes a motor and pinion with teeth that mate with teeth on the first end of the bell crank.

13. The flight vehicle of claim 1, further comprising:
a first pivot shaft within the first wing and attached at a first end of the first pivot shaft to the second end of the first wing tip shaft and at a second end of the first pivot shaft to the first aileron; and
a second pivot shaft within the second wing and attached at a first end of the second pivot shaft to the second end of the second wing tip shaft and at a second end of the second pivot shaft to the second aileron.

14. The flight vehicle of claim 1, wherein the first pivot pin is cylindrical in shape and the second pivot pin is cylindrical in shape.

15. The flight vehicle of claim 14, wherein the opening in the first pivot pin has a substantially hourglass cross-sectional shape to allow the first lever pin to pivot within the first pivot pin about the first end of the first wing tip shaft, and wherein the opening in the second pivot pin has a substantially hourglass cross-sectional shape to allow the second lever pin to pivot within the second pivot pin about the first end of the second wing tip shaft.

16. A control system for a flight vehicle comprising:
a first pivot pin having a hollow cylindrical shape with an opening therein;
a second pivot pin having a hollow cylindrical shape with an opening therein;
a first deployable wing configured to pivot about the first pivot pin between a stowed position and a deployed position, the first deployable wing having a first wing tip shaft extending between the first pivot pin and a first aileron at a tip of the first deployable wing;
a second deployable wing configured to pivot about the second pivot pin between the stowed position and the deployed position, the second deployable wing having a second wing tip shaft extending between the second pivot pin and a second aileron at a tip of the second deployable wing;
a first lever pin within the opening in the first pivot pin with the first lever pin having a first end that extends out from a top of the first pivot pin and a second end connected to the first wing tip shaft, the first lever pin configured to rotate the first wing tip shaft to control the first aileron; and
a second lever pin within the opening in the second pivot pin with the second lever pin having a first end that extends out from a top of the second pivot pin and a second end connected to the second wing tip shaft, the second lever pin configured to rotate the second wing tip shaft to control the second aileron.

17. The control system of claim 16, further comprising:
a bell crank with a first arm adjacent to the first end of the first lever pin and a second arm adjacent to the first end of the second lever pin, the bell crank configured to move the first end of the first lever pin to rotate the first wing tip shaft and to move the first end of the second lever pin to rotate the second wing tip shaft when the first deployable wing and the second deployable wing are in the deployed position.

18. The control system of claim 16, further comprising:
an actuator connected to the bell crank and configured to pivot the bell crank about a pivot point to move the first arm and the second arm of the bell crank.

19. The control system of claim 16, wherein the first deployable wing, the first pivot pin, and the first lever pin are configured to rotate from the stowed position to the deployed position so that the first lever pin is in contact with the first arm of the bell crank when in the deployed position and is not in contact with the first arm of the bell crank when in the stowed position, and wherein the second deployable wing, the second pivot pin, and the second lever pin are configured to rotate from the stowed position to the deployed position so that the second lever pin is in contact with the second arm of the bell crank when in the deployed position and is not in contact with the second arm of the bell crank when in the stowed position.

20. The control system of claim 16, wherein the first lever pin has an elongated cross-sectional shape configured to be in contact with a first fork on the first arm of the bell crank when in the deployed position and provide clearance between the first lever pin and the first fork when in the stowed position and the second lever pin has an elongated cross-sectional shape configured to be in contact with a second fork on the second arm of the bell crank when in the deployed position and provide clearance between the second lever pin and the second fork when in the stowed position.

\* \* \* \* \*